(12) United States Patent
Young et al.

(10) Patent No.: US 8,386,953 B1
(45) Date of Patent: Feb. 26, 2013

(54) ACCORDION USER INTERFACE

(75) Inventors: David S. Young, San Francisco, CA (US); Edward J. Kessler, Los Gatos, CA (US); Benjamin L. Grol-Prokopczyk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 12/916,340

(22) Filed: Oct. 29, 2010

(51) Int. Cl.
*G06F 3/048* (2006.01)
(52) U.S. Cl. ......... 715/780; 715/765; 715/810; 707/610
(58) Field of Classification Search .................. 715/764, 715/765, 780, 810, 866; 707/609, 626, 634, 707/637, 638, 661
See application file for complete search history.

(56) References Cited

U.S. PATENT DOCUMENTS

| | | | |
|---|---|---|---|
| 2010/0088347 A1* | 4/2010 | James | 707/802 |
| 2011/0145099 A1* | 6/2011 | Berger et al. | 705/27.1 |
| 2011/0218983 A1* | 9/2011 | Chaney et al. | 707/705 |
| 2011/0246230 A1* | 10/2011 | Sie et al. | 705/3 |

* cited by examiner

*Primary Examiner* — Xiomar L Bautista
(74) *Attorney, Agent, or Firm* — Shumaker & Sieffert, P.A.

(57) ABSTRACT

A method executed at a client computer accesses a data record having a fixed set of predefined fields and a set of custom fields. Each predefined field has a predefined field name and a field value, and each custom field has a user-specified field name and a field value. The method displays the data record in a graphical user interface, which includes data entry controls for user specification of a field name and a field value. The method receives input from a user that includes a user-specified field name in the data entry controls. When the user-specified field name matches a field name of a predefined field, the method stores a user-supplied value in that predefined field. When the user-specified field name does not match the field name of any predefined field, the method stores the user-specified field name and the user-supplied value in an allocated custom field.

16 Claims, 13 Drawing Sheets

ACCORDION USER INTERFACE

TECHNICAL FIELD

The disclosed embodiments relate generally to graphical user interfaces, and more specifically to display of predefined and custom fields in graphical user interfaces.

BACKGROUND

Many software applications store relevant data as records in a database. The data records typically have certain fields defined by the software application, such as fields for name and address. In many cases there are a large number of predefined fields that could be used, so a common dilemma for software developers is whether to create every possible field or provide flexibility in the form of custom fields, which can be adapted as needed.

A significant drawback to creating a large number of predefined fields is that many of the fields are not commonly used. Display of the fields in a user interface is thus cumbersome and distracting to users, and sometimes obscures the more important fields that are relevant to most users. Because of these problems, some developers create predefined fields for the more important fields, and provide the flexibility of custom fields to store data for fields that are rarely used. However, custom fields are potentially redundant over predefined fields. For example, a user may create a custom field when a suitable predefined field already exists.

SUMMARY

The above deficiencies and other problems associated with the graphical display of data records (e.g., with a large number of fields) are addressed by embodiments of the present inventions. In some embodiments, a hybrid structure provides predefined fields, with a limited number of those fields displayed. In some embodiments, the hybrid structure also provide for custom fields. When a user "creates" a custom field, the field name (or "label") provided by the user is matched against the predefined fields; when a match is detected, the data is stored into the matching existing predefined field rather than in a custom field.

In accordance with some embodiments, a computer-implemented method to utilize data records with both predefined fields and custom fields executes at a client computer with one or more processors and memory. The memory stores one or more programs for execution by the one or more processors. The method accesses a data record having a fixed set of predefined fields and a set of custom fields. Each predefined field has a predefined field name and a field value, and each custom field has a user-specified field name and a field value. The method displays the data record in a graphical user interface, which includes data entry controls for user specification of a field name and a field value. The method receives input from a user that includes a user-specified field name in the data entry controls. When the user-specified field name matches a field name of a respective predefined field, the method stores a user-supplied value in the respective predefined field. When the user-specified field name does not match the field name of any of the predefined fields, the method stores the user-specified field name and the user-supplied value in an allocated custom field.

Thus methods and systems are provided that simultaneously have the flexibility of custom fields and an uncluttered graphical user interface, as well as a defined structure for many fields that may be used. In particular, the simplified user interface is more efficient for users (who do not need to search through many screens or tabs for a certain field), while retaining the structure of predefined fields (which can be translated, formatted appropriately, etc.).

BRIEF DESCRIPTION OF THE DRAWINGS

For a better understanding of the aforementioned embodiments of the inventions as well as additional embodiments thereof, reference should be made to the Description of Embodiments below, in conjunction with the following drawings in which like reference numerals refer to corresponding parts throughout the figures.

Reference will now be made in detail to embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details.

DESCRIPTION OF EMBODIMENTS

The terminology used in the description herein is for the purpose of describing particular embodiments only and is not intended to be limiting. As used in the description and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1A:
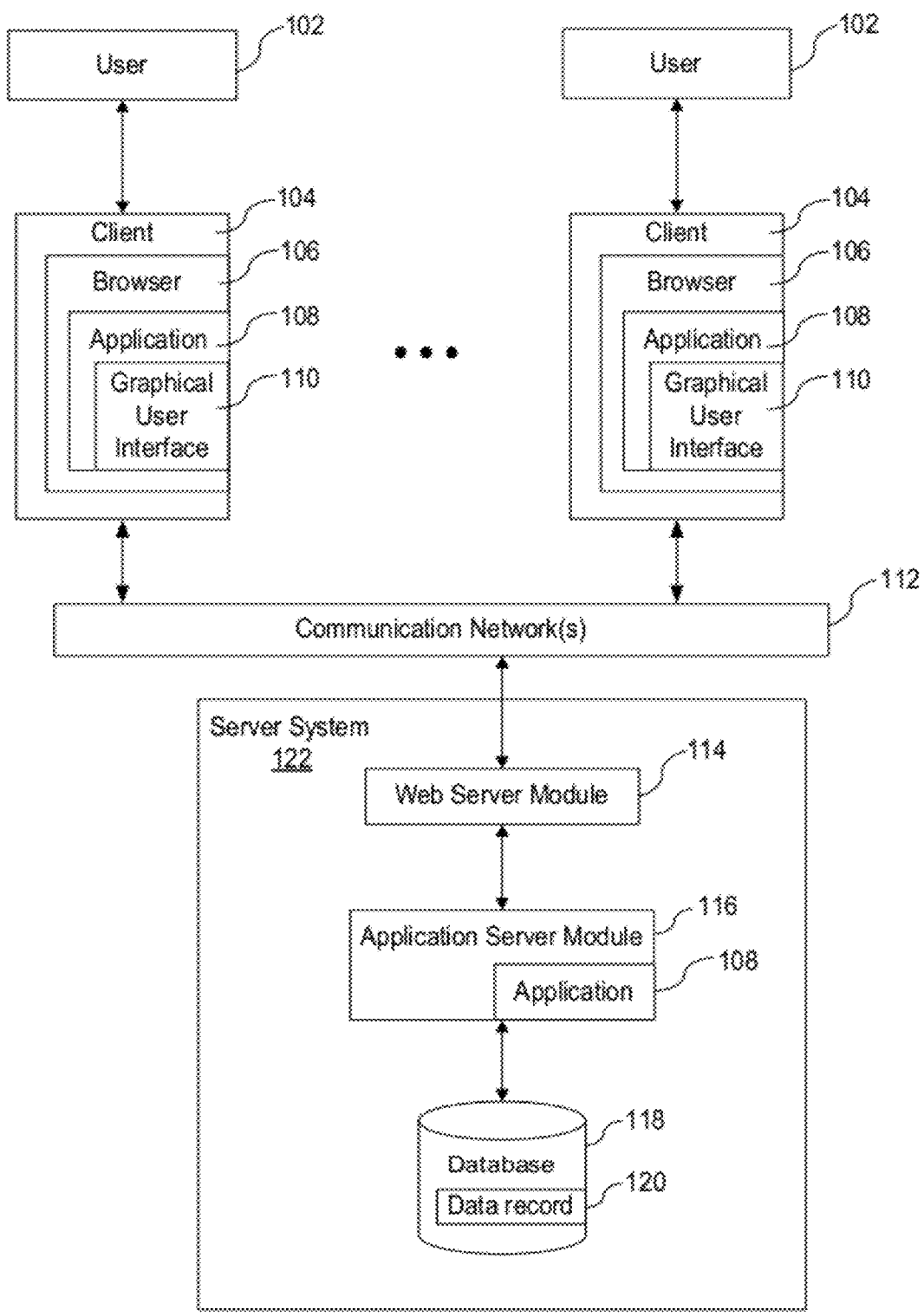
FIG. 1A illustrates an exemplary network environment in which some embodiments operate.

FIG. 1A illustrates an exemplary network environment in which some embodiments operate. A user 102 uses a client computer 104 to communicate with a web server 114 over a communications network 112. The communication network 112 can be the Internet, other wide area networks, local area networks, metropolitan area networks, and so on, or any combination of these. In some embodiments a software application 108 runs within a web browser 106. In other embodiments (not shown), a software application 108 runs on the client 104 outside of a web browser 106. In some embodiments, software application 108 includes a graphical user interface 110. In some embodiments, the user interface may be primarily text-based, with limited or no use of graphics.

A web server 114 receives requests from client computers 104 and returns web pages and data to the requesting client computers 104. The web server 114 communicates with application server 116, which may reside at the same physical location as the web server. The application server 116 stores one or more application programs 108, which may be requested by client computers 104. When a client computer 104 initially requests an application 108, application server 116 retrieves all or portions (e.g., individual web pages) of the application 108 for transmittal to the client 104. In some embodiments, application 108 reads and stores data in a database 118. In some embodiments, database 118 physically resides at the same location as the web server 114 and/or the application server 116. The database 118 stores one or more data records 120, which are stored in one or more database tables.

In some embodiments, the web server 114, application server 116, and database 118 are modules within a server system 122.

Figure 1B:
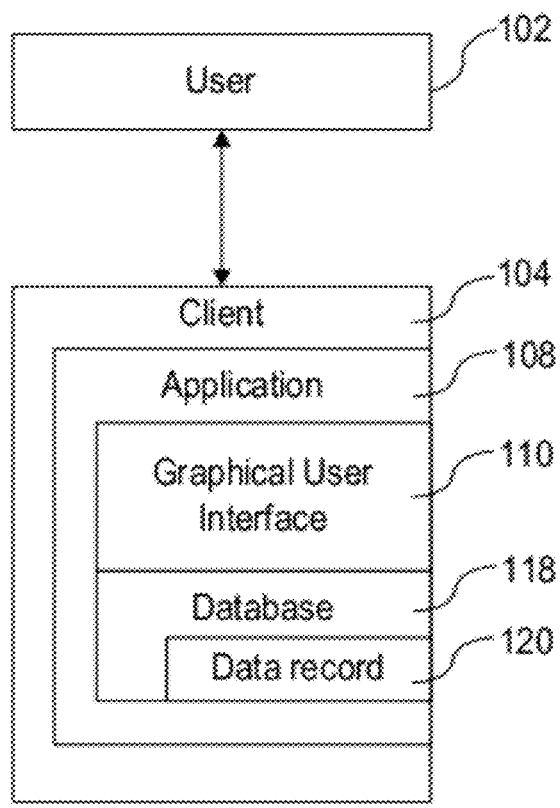
FIG. 1B illustrates a client system according to some embodiments.

FIG. 1B illustrates an alternative embodiment where the software application 108 is saved or installed locally on a client computer 104. In some of these embodiments, the application 108 includes a database 118 that runs locally on the client computer 104. In these embodiments, the database 118 typically stores data records 120 only for the user(s) 102 of the particular client computer 104. In some embodiments (not shown), application 108 is saved or installed locally, but accesses data records 120 from a database 118 running on a server remote from the client computer 104.

Figure 2:
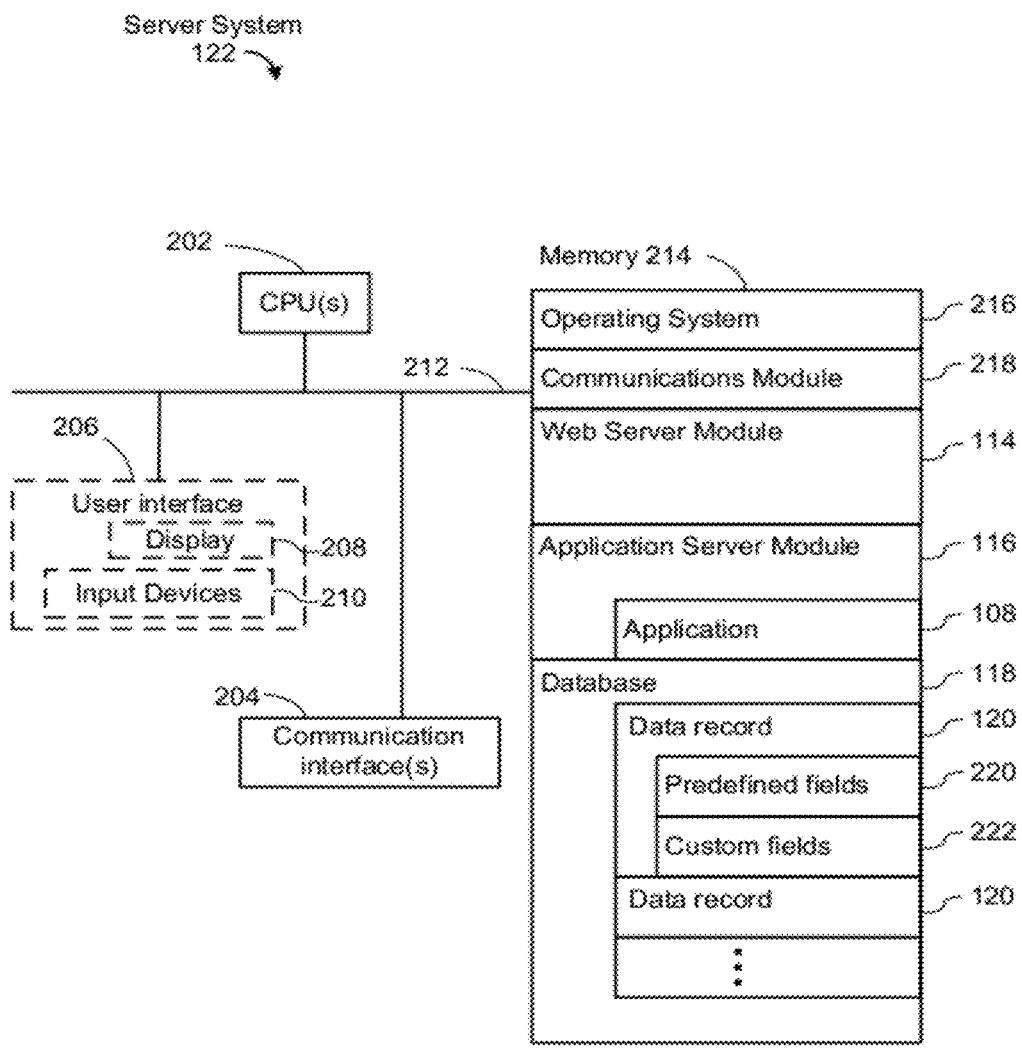
FIG. 2 is a block diagram of a server system according to some embodiments.

FIG. 2 is a block diagram illustrating a server system 122 used to manage one or more software applications 108 and associated data 120 in accordance with some embodiments. The server system 122 typically includes one or more processing units (CPU's) 202 for executing modules, programs and/or instructions stored in memory 214 and thereby performing processing operations; one or more network or other communications interfaces 204; memory 214; and one or more communication buses 212 for interconnecting these components. In some embodiments, the server system 122 includes a user interface 206 with a display device 208 and one or more input devices 210. In some embodiments, memory 214 includes high-speed random access memory, such as DRAM, SRAM, DDR RAM or other random access solid state memory devices. In some embodiments, memory 214 includes non-volatile memory, such as one or more magnetic disk storage devices, optical disk storage devices, flash memory devices, or other non-volatile solid state storage devices. In some embodiments, memory 214 includes one or more storage devices remotely located from the CPU(s) 202. Memory 214, or alternately the non-volatile memory device(s) within memory 214, comprises a non-transitory computer readable storage medium. In some embodiments, memory 214 or the computer readable storage medium of memory 214 stores the following programs, modules and data structures, or a subset thereof:

- an operating system 216 that includes procedures for handling various basic system services and for performing hardware dependent tasks;
- a communications module 218 that is used for connecting the server system 122 to other computers (e.g., client computers 104, FIG. 1A) via the one or more communication network interfaces 204 (wired or wireless) and one or more communication networks 112, such as the Internet, other wide area networks, local area networks, metropolitan area networks, and so on;
- a web server module 114 that delivers appropriate web pages in response to requests from client computers 104;
- an application server module 116 that provides the business logic and user interface for one or more applications 108 that may be accessed by a user 102 (FIG. 1A); and
- a database module 118 that stores data for use by the applications 108. In some embodiments, the database 118 is a SQL database; in some other embodiments, the database 118 is a file server that stores individual data records 120 as files. In some embodiments, two or more data records 120 are saved in a single file. Each data record 120 includes a fixed set of predefined fields 220 and provides storage capacity for zero or more custom fields 222 for each data record 120.

Figure 6A:
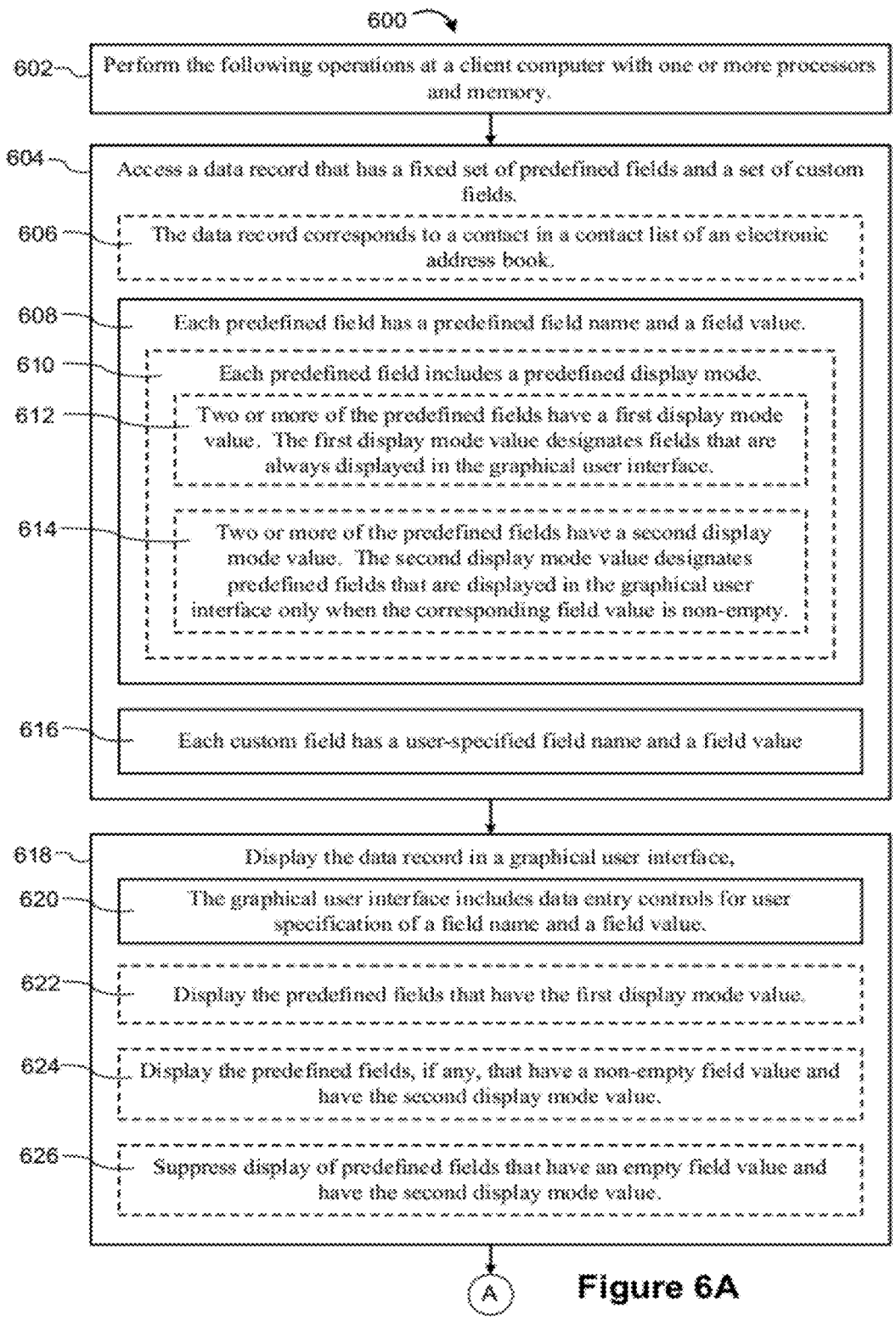
FIGS. 6A and 6B provide a flowchart of a process for displaying a graphical user interface with both predefined fields and custom fields according to some embodiments.
Figure 6B:
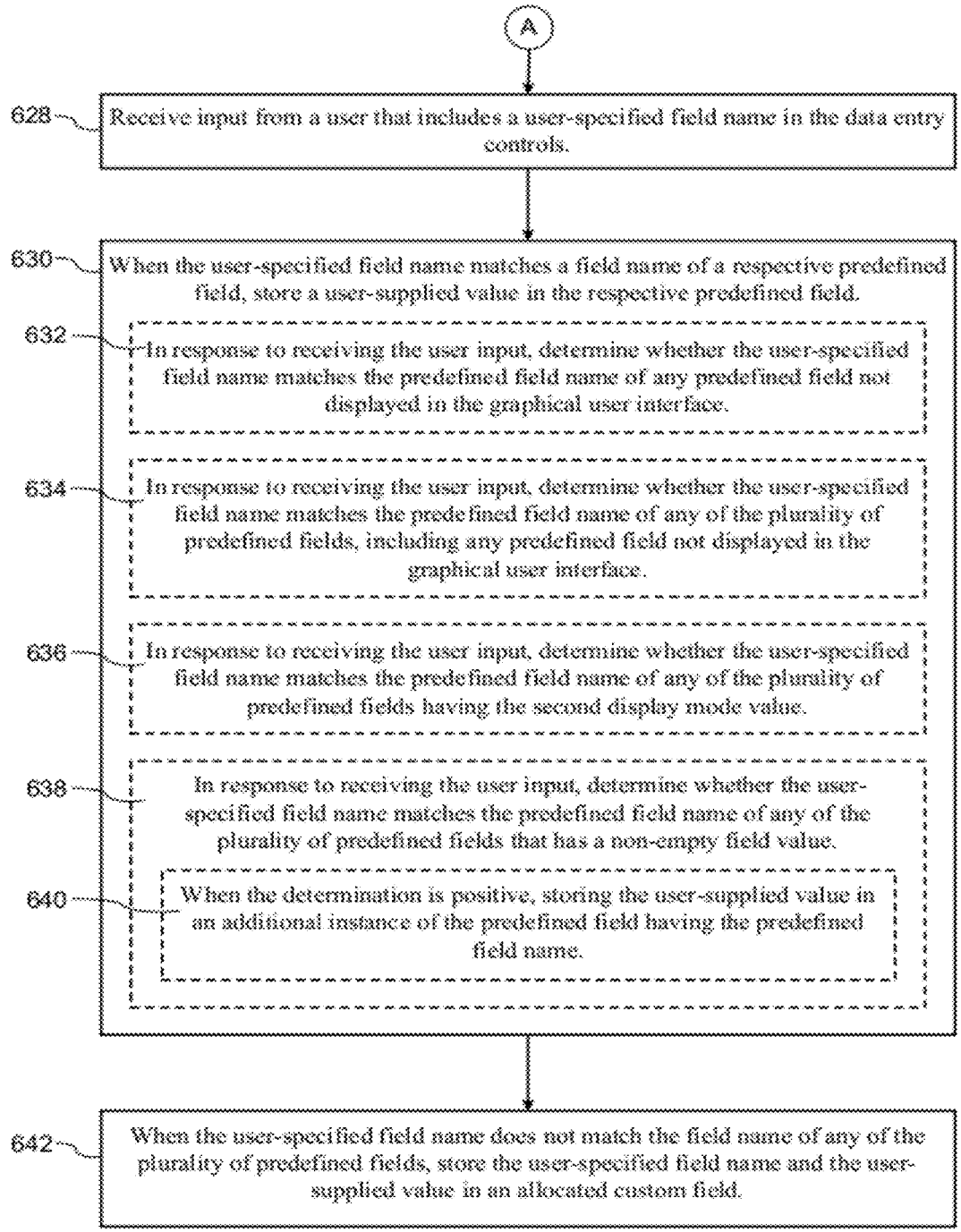

In some embodiments, the web server module 114, application server module 116, database module 118, or a combination thereof include instructions for performing all or a portion of the process 600 (FIGS. 6A-6B).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 214 may store a subset of the modules and data structures identified above. Furthermore, memory 214 may store additional modules or data structures not described above.

Although FIG. 2 shows a server system 122 that manages and delivers web applications, FIG. 2 is intended more as functional description of the various features that may be present in a set of one or more computers rather than as a structural schematic of the embodiments described herein. In practice, and as recognized by those of ordinary skill in the art, items shown separately could be combined and some items could be separated. For example, the web server module 114 and application server module 116 shown separately in FIG. 2 could be implemented on separate computer systems, or on a single computer system, and single items shown in FIG. 2 could be implemented by one or more computer systems. The actual number of computers used to implement server system 122, and how features are allocated among them will vary from one implementation to another, and may depend in part on the amount of data traffic that the system must handle during peak usage periods as well as during average usage periods.

Figure 3:
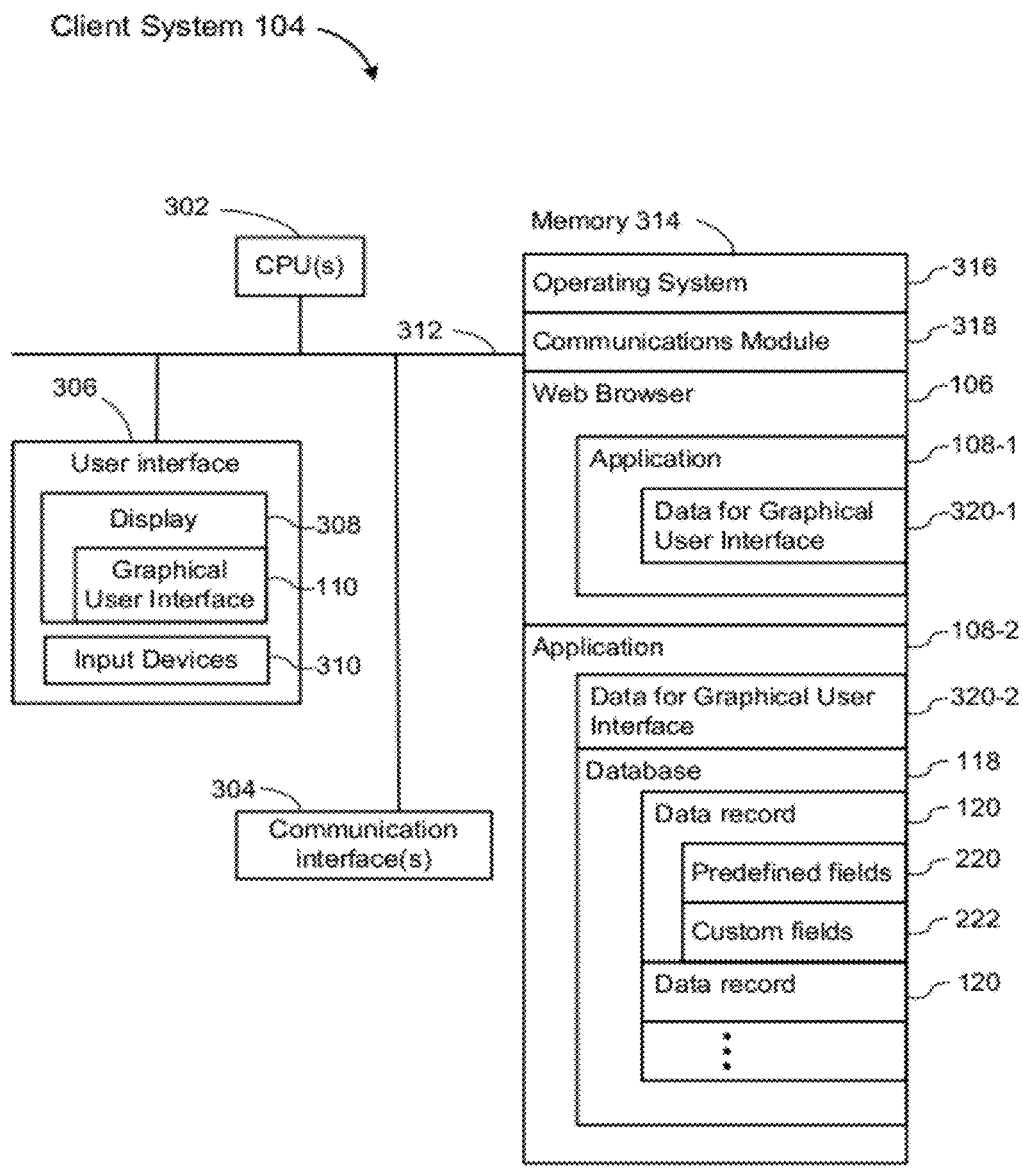
FIG. 3 is a block diagram of a client system according to some embodiments.

FIG. 3 is a block diagram illustrating a client system 104, which may access various software applications 108 and associated data 120 in accordance with some embodiments. The client system 104 typically includes one or more processing units (CPU's) 302 for executing modules, programs and/or instructions stored in memory 314 and thereby performing processing operations; one or more network or other communications interfaces 304; memory 314; and one or more communication buses 312 for interconnecting these components. The client system 104 includes a user interface 306 with a display device 308 and one or more input devices 310. The display device 308 visually displays the graphical user interfaces 110 of the applications 108. In some embodiments, memory 314 includes high-speed random access memory, such as DRAM, SRAM, DDR RAM or other random access solid state memory devices. In some embodiments, memory 314 includes non-volatile memory, such as one or more magnetic disk storage devices, optical disk storage devices, flash memory devices, or other non-volatile solid state storage devices. In some embodiments, memory 314 includes one or more storage devices remotely located from the CPU(s) 302. Memory 314, or alternately the non-volatile memory device(s) within memory 314, comprises a non-transitory computer readable storage medium. In some embodiments, memory 314 or the computer readable storage medium of memory 314 stores the following programs, modules and data structures, or a subset thereof:

- an operating system 316 that includes procedures for handling various basic system services and for performing hardware dependent tasks;
- a communications module 318 that is used for connecting the client system 104 to other computers (e.g., the server system 122, FIGS. 1A & 2) via the one or more communication network interfaces 304 (wired or wireless) and one or more communication networks 112, such as the Internet, other wide area networks, local area networks, metropolitan area networks, and so on;
- a web browser 106 that requests appropriate web pages from a web server 114, and renders the received web pages on the display device 308. In some embodiments, a software application 108-1 runs in the browser 106 to provide certain functionality to the user 102 (FIGS. 1A-1B) of the application. The application 108-1 stores data 320-1 used by the graphical user interface 110; and
- in alternative embodiments, an application 108-2 stored or installed locally on the computer system 104. In these embodiments, the application 108-2 includes data 320-2 for the graphical user interface 110. In some of these embodiments, the application 108-2 includes a database 118, which stores data records 120 for the application 108-2. For example, the database 118 is a SQL database, a collection of one or more flat files, or a proprietary database mechanism. Each data record 120 includes a fixed set of predefined fields 220 and provides storage capacity for zero or more custom fields 222 for each data record.

In some embodiments, the web browser 106 and/or application(s) 108 include instructions to perform all or a portion of the process 600 (FIGS. 6A-6B).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 314 may store a subset of the modules and data structures identified above. Furthermore, memory 314 may store additional modules or data structures not described above.

FIGS. 4A-4F illustrate screenshots of a graphical user interface (GUI) 400 used in an exemplary process (e.g., the process 600, FIGS. 6A-6B) of adding data to a data record 120 according to some embodiments. These figures show a contacts list 402, which, for example, is incorporated in an electronic mail system or an electronic address book.

Figure 4A:
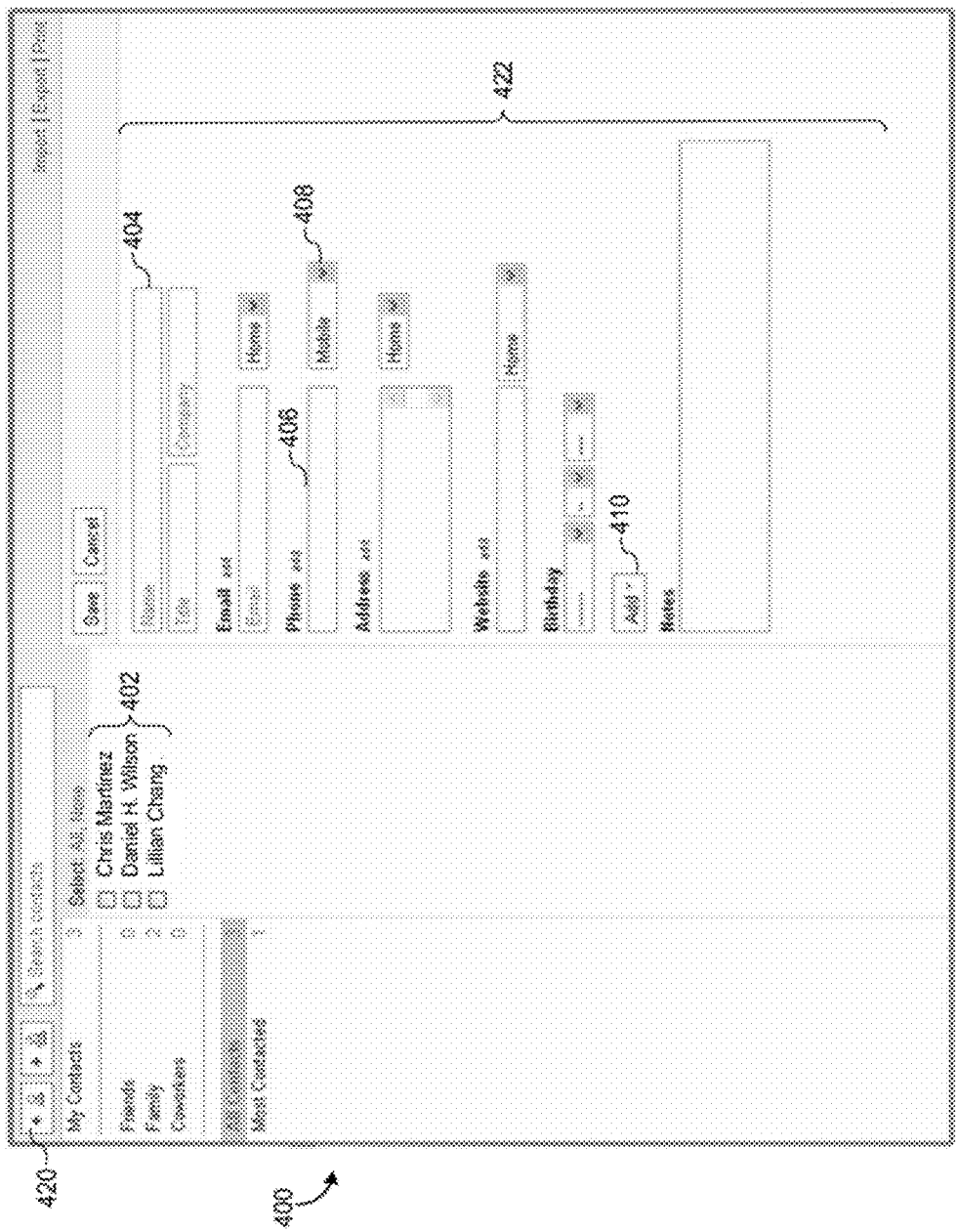
FIGS. 4A-4F are screen shots of a graphical user interface according to some embodiments.
Figure 4B:
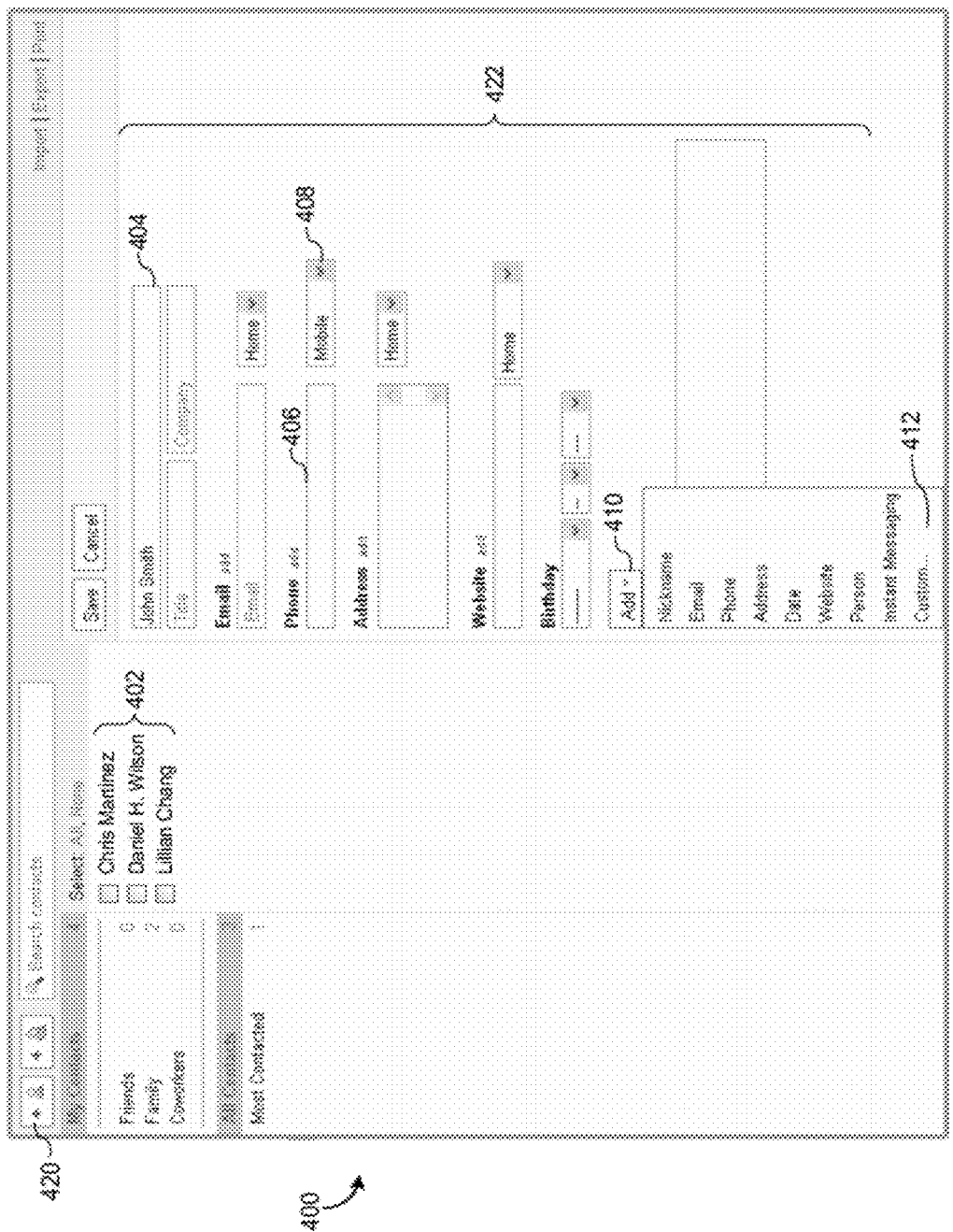
Figure 4C:
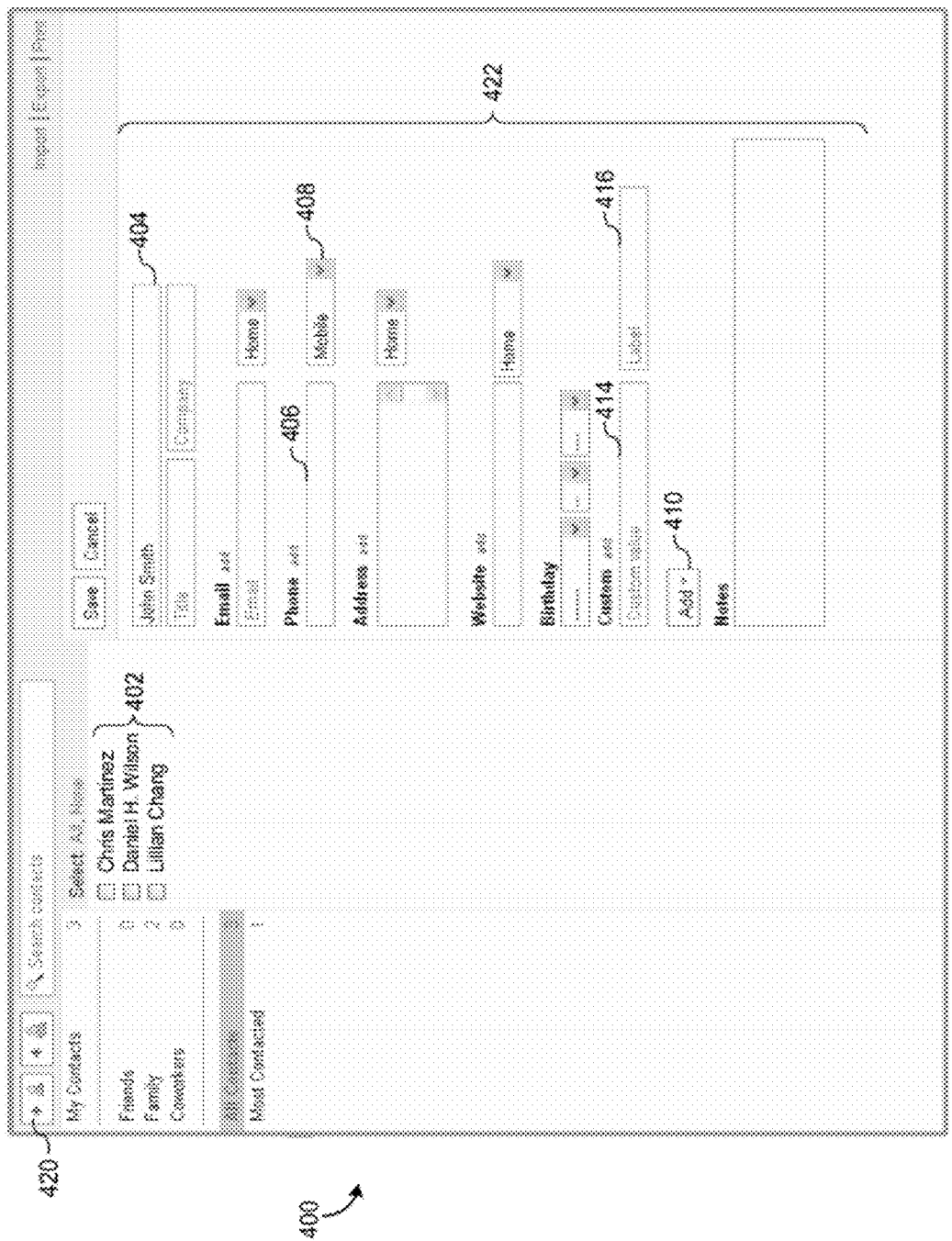

In the embodiment shown, a user 102 (FIGS. 1A-1B) initially has three contacts in the contact list 402. When the user 102 presses the add contact button 420, the contact data frame 422 displays data entry controls (also called user interface objects) for a set of contract entry fields, including data entry controls for a name field 404, a phone field 406, a phone type field 408, and an add drop down button 410 (to display additional fields). In FIG. 4B, a user has entered the name "John Smith" in name field data entry control 404 and clicked the add drop down button data entry control 410, which displays various additional fields that may be selected. When the "custom" menu item 412 is selected, additional data entry controls 414 and 416 are added to the contact data frame 422 as shown in FIG. 4C. The custom value data control 414 allows a user to enter a custom value for a custom field. The label data control (sometimes called "field name control") 416 allows a user to enter a field name for the custom field. In alternative embodiments, the custom value control 414 and field name control 416 are displayed in the contact data frame 422 whenever a contact is added or edited, without requiring the user to "add" these controls using the drop-down menu 410.

Figure 4D:
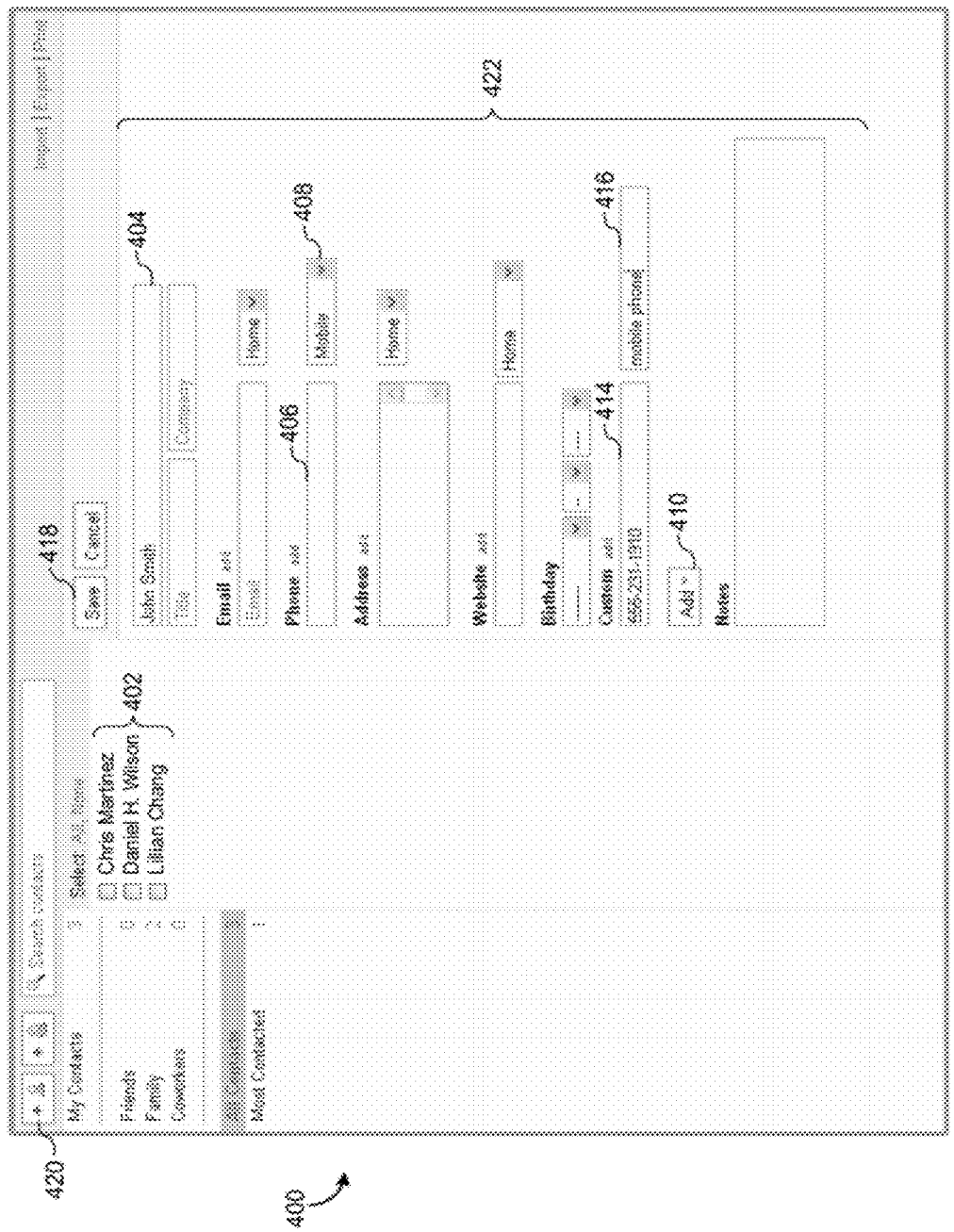
Figure 4E:
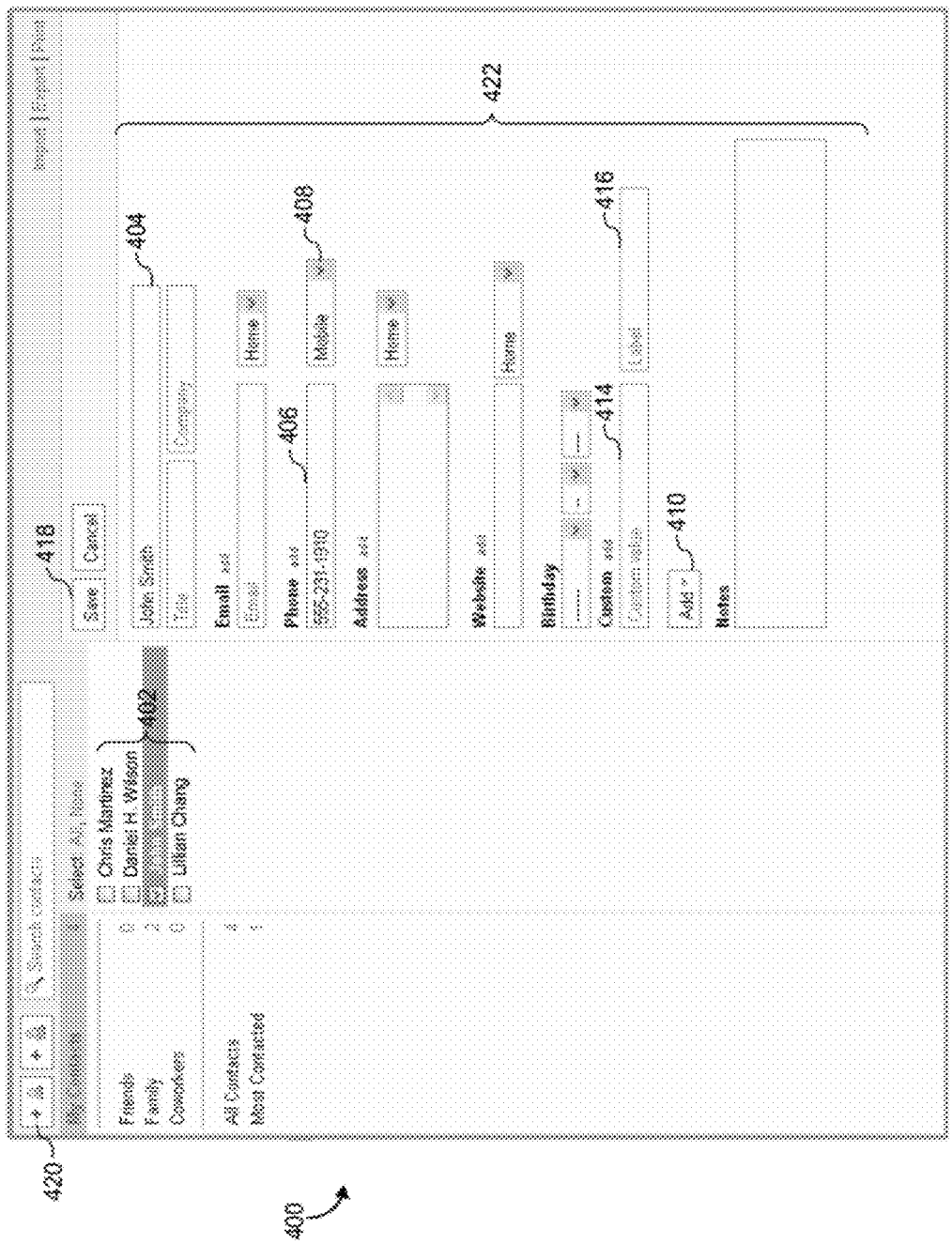

In FIG. 4D, a user 102 has entered the value "555-231-1910" in the custom value data control 414 and "mobile phone" in the field name control 416. In this case, there is a predefined field 220 that would have been appropriate for this custom data. In particular, the phone field 406 with phone type "Mobile" 408 would be the proper place to put information for John Smith's mobile phone. After the user presses the save button 418, the new contact "John Smith" is added to the contact list 402, as shown in FIG. 4E: a data record for the new contact "John Smith" is created and the value "555-231-1910" is stored in the data record in a predefined field for a mobile phone.

Figure 4F:
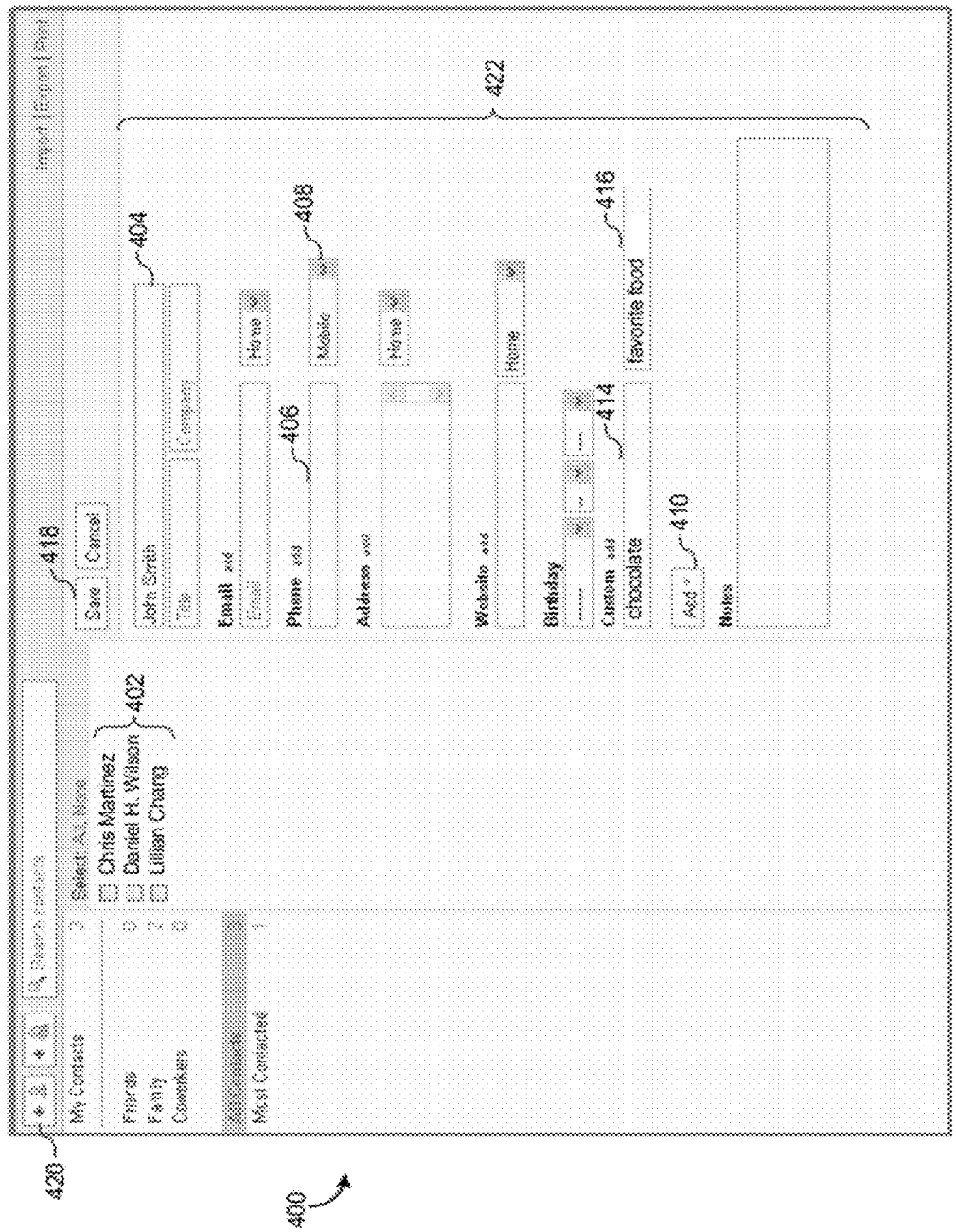

In this case, the label "mobile phone" was matched to the predefined field for a mobile phone. Rather than inserting the data into an actual custom field, the phone number was saved into the predefined phone field 406 as illustrated. The data entry controls 414 and 416 are empty because the data was saved to the predefined field 406 instead. If the label had not matched one of the predefined fields (e.g., if the label were "favorite food" and the value were "chocolate"), then it would have been saved as a custom field, and the information entered in data entry controls 414 and 416 would remain in the "custom" information portion of the graphical user interface 400, as shown in FIG. 4F. Furthermore, as shown in FIGS. 4B-4F, some predefined fields (e.g., nickname, person, instant messaging, etc.) with empty values are not displayed, while other predefined fields (e.g., phone, address, website, etc.) with empty values are displayed in the graphical user interface 400.

In some embodiments, the matching against predefined fields is performed only for predefined fields that are not displayed. These embodiments assume that the user can see the predefined fields that are visible, and thus can use them; on the other hand, a user has no way of entering data into a predefined field that is not displayed in the user interface. In these embodiments, if the user enters a custom field for "mobile phone" as shown in FIG. 4D, a match to the predefined field for mobile phones will not occur and a custom field will be created instead.

Some embodiments address the case where there are multiple fields with the same label. If the label does not match a predefined field, then any number of custom fields can be created with the same label. If the label does match a predefined field, the action taken may depend on whether the predefined field is already in use. For example, in some embodiments, when there is a matching predefined field, but it already has a non-empty value (e.g., has at least one character that is not a blank space), the data in the controls will create a custom field. For example, most contact lists for email systems have a predefined field for a home email address. If the contact actually has two or more home email addresses and a second one is entered as a custom field value with label "home email address," then a custom field is created rather than overwriting the first email address that is already stored in the home email address predefined field.

Figure 5:
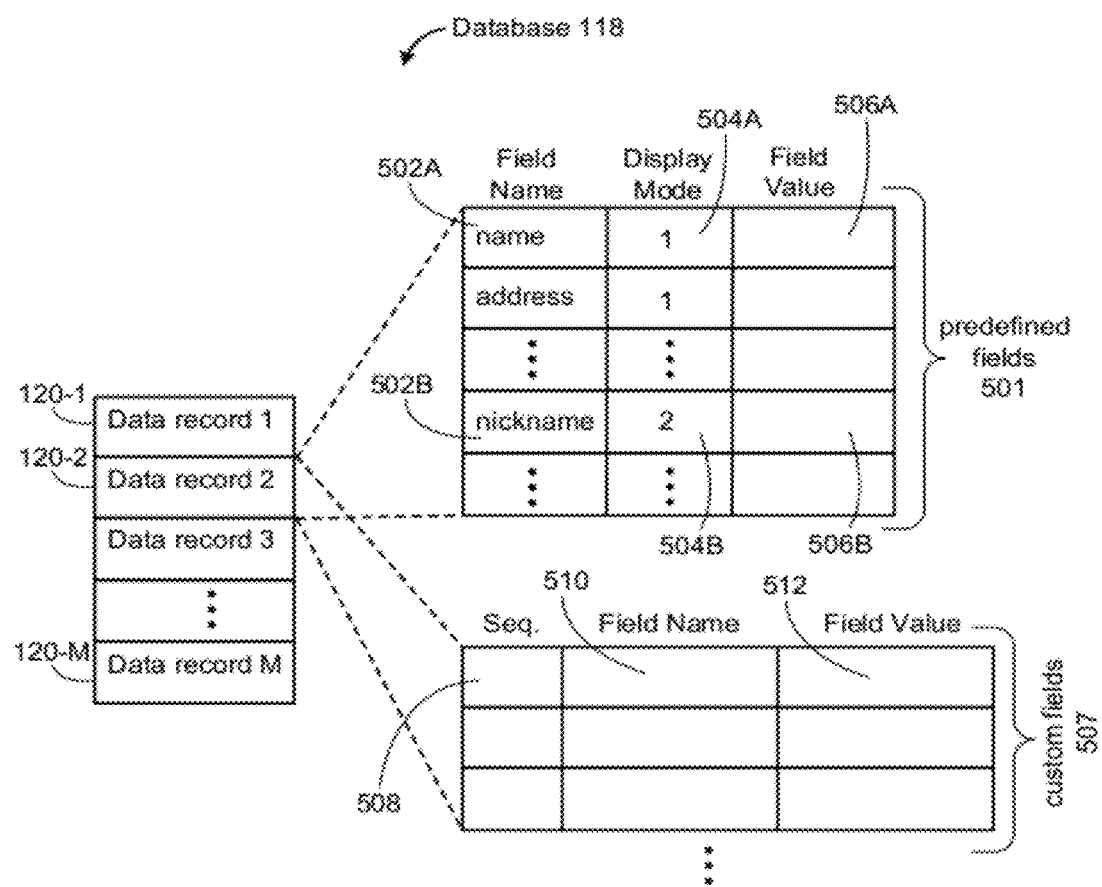
FIG. 5 illustrates exemplary data structures according to some embodiments.

FIG. 5 illustrates an exemplary data structure that can be used to store data records according to some embodiments. In preferred embodiments, database 118 comprises a plurality of data records 120-1 to 120-M. Each data record 120, such as data record 2 (120-2), has a fixed set of predefined fields 501 and a structure that can store zero or more custom fields 507. Each predefined field has a fixed field name and space to store a value for the field. For example, the first predefined field for the data record 2 (120-2) as illustrated in FIG. 5 has field name "name" 502A, and has space 506A to store a name. The field name 502A is defined one time (e.g., by a software developer), but the value 506A stored in the field can be different for each data record 120, and can be modified even after it is filled in. In some embodiments, each predefined field has a display mode, which indicates how to display the predefined field in a graphical user interface. The display mode value 1 (504A) for the "name" field indicates that the name field will always be displayed. The field whose field name is "nickname" 502B has a display mode value of 2, indicating that the nickname field is displayed only under certain conditions. The "nickname" field has a display mode value of 2, for example, because it is used much less frequently than the "name" field. Thus, for example, the nickname field is only displayed when the field value 506B is non-empty. When the nickname field has an empty field value 506B, the nickname field is not displayed. Conceptually, because the nickname field is not commonly used, suppressing its display provides a simpler and less cluttered user interface; however, when the field is used, the data is displayed for the user's benefit. Different embodiments use different sets of predefined fields, and need not use "name", "address", or "nickname" as any of the predefined fields.

Each data record, such as data record 2 (120-2) can have zero or more custom fields 507. Each custom field has a field name and a field value like the predefined fields. However, unlike custom fields, the predefined fields always exist. Once a data record is created, space is allocated for each of the predefined fields. A data record need not have any custom fields. Also, in some embodiments, the field names of the predefined fields are not user definable, whereas the names of custom fields are defined by the user. In some embodiments, however, a user is allowed to create "labels" for some or all of the predefined fields. In those embodiments, the data structure for the predefined fields 501 typically includes an additional column to accommodate a user-defined label.

In some embodiments, the data structure for the custom fields 507 includes a sequence number 508, a field name (or label) 510, and a field value 512. In some embodiments, the sequence number 508 is omitted, but the presence of a sequence number provides several benefits. First, the sequence number provides a well-defined order for the custom fields when they are displayed in the user interface. A user might be confused if the custom fields were displayed in a random order or ordered based on the field names. Second, the sequence number distinguishes between two instances of custom fields with the same field name. By using the sequence number 508, a change to the field value 512 for one of the instances will update only that instance (not the wrong instance or both instances). Third, a sequence number 508 provides a unique internal key for each custom field. This facilitates allowing users to change the field name 510 of a custom field 507 after it is created.

FIGS. 6A and 6B are a flowchart of an exemplary process 600 performed using a graphical user interface (e.g., GUI 400, FIGS. 4A-4F) according to some embodiments. The process 600 operates (602, FIG. 6A) at a client computer (e.g., client computer 104, FIGS. 1A, 1B and 3) with one or more processors and memory. The process accesses (604) a data record (e.g., a data record 120, FIG. 5) that has a fixed set of predefined fields (e.g., fields 501, FIG. 5) and a set of custom fields (e.g., fields 507, FIG. 5). The set of predefined fields comprises at least one predefined field, and the set of custom fields comprises zero or more custom fields. In some embodiments, the data record corresponds (606) to a contact in a contact list (e.g., contact list 402, FIGS. 4A-4x) of an electronic address book.

Each predefined field (e.g., fields 501, FIG. 5) has (608) a predefined field name and a field value. In other words, the name of the field is predefined but the value is not predefined. The value is assigned by a user 102 who interacts with the graphical user interface, and the value is subject to change. Some embodiments provide an additional "label" characteristic associated with predefined fields, and the labels may be assigned and modified by end users 102.

In some embodiments, each predefined field (e.g., fields 501, FIG. 5) includes (610) a predefined display mode. In the embodiments that utilize a display mode, two or more of the predefined fields have (612) a first display mode value (e.g., "1"). The first display mode value designates (612) fields that are always displayed in the graphical user interface (examples of a user interface with fields that are always displayed are shown in FIGS. 4B-4F). In some embodiments, two or more of the predefined fields have (614) a second display mode value (e.g., "2"). The second display mode value designates (614) predefined fields that are displayed in the graphical user interface only when the corresponding field value is non-empty. For example, a field whose data type is a character string is typically considered non-empty when the field value contains something other than a blank space (or, more generally, not "white space"). Each custom field (e.g., fields 507, FIG. 5) has (616) a user-specified field name and a field value. For custom fields, both the field name and the field value are specified by the user. However, in some embodiments the field name is specified one time when the custom field is created whereas the field value changes as needed (e.g., when a contact changes his or her phone number or address).

The process 600 displays (618) the data record in the graphical user interface (e.g., graphical user interface 400 in any of FIGS. 4C-4E). In some embodiments, the graphical user interface includes (620) data entry controls (e.g., controls 414, 416, FIG. 4C) for user specification of a field name and a field value. In some embodiments, data entry controls for user specification of a field name and a field value are displayed in response to a user action, such as clicking a button (add drop down button 410, FIG. 4B), or selecting a menu option. In some embodiments, the graphical user interface displays (622) the predefined fields that have the first display mode value. In some embodiments, the graphical user interface displays (624) the predefined fields, if any, that have a non-empty field value and have the second display mode value. In some embodiments, the fields displayed are included in a tabbed display, so some of the fields may be visible only when a certain tab is selected. As used herein, a field is considered "displayed" in a tabbed user interface when the field is visible in one or more of the tabs. In other words, all fields in all of the tabs are considered "displayed," regardless of which tab is selected. In some embodiments, the graphical user interface suppresses display (626) of predefined fields that have an empty field value and have the second display mode value.

The process 600 receives (628, FIG. 6B) input from a user 102 that includes a user-specified field name in the data entry controls (see, for example, FIG. 4D). When the user-specified field name matches (630) a field name of a respective predefined field, the process stores (630) a user-supplied value in the respective predefined field.

In some embodiments, the process 600 determines (632), in response to receiving the user input, whether the user-specified field name matches the predefined field name of any predefined field not displayed in the graphical user interface. When there is a match, the user-supplied value is stored in the matching predefined field, and the matching field is then displayed in the graphical user interface. Otherwise, a custom field is allocated having the user-specified field name and user-supplied field value.

In some embodiments, the process 600 determines (634), in response to receiving the user input, whether the user-specified field name matches the predefined field name of any of the plurality of predefined fields, including any predefined field not displayed in the graphical user interface. When there is a match, the user-supplied value is stored in the matching predefined field (e.g. a predefined field 501, FIG. 5), and the matching field is then displayed in the graphical user interface, even if it was not displayed previously. Otherwise, a custom field (e.g. a custom field 507, FIG. 5) is allocated having the user-specified field name and user-supplied field value.

In some embodiments, the process 600 determines (636), in response to receiving the user input, whether the user-specified field name matches the predefined field name of any of the plurality of predefined fields (e.g. predefined fields 501, FIG. 5) having the second display mode value. When there is a match, the user-supplied value is stored in the matching predefined field, and the matching field is then displayed in the graphical user interface (see example shown in FIG. 4E). Otherwise, a custom field is allocated having the user-specified field name and user-supplied field value (see example shown in FIG. 4F). In some embodiments, when the user-specified field name matches a field having a display mode with the first display mode value, an error message is displayed and/or logged.

In some embodiments, the process 600 determines (638), in response to receiving the user input, whether the user-specified field name matches the predefined field name of any of the plurality of predefined fields that has a non-empty value. When the determination is positive, thus indicating that a first instance of a field with a predefined field name matching the user specified field name is not empty, the process 600 stores (640) the user supplied value in an additional instance of the predefined field having the predefined field name. To support these embodiments, the data structures illustrated in FIG. 5 may be modified. For example, the field value is created as an array, or the additional instance(s) of predefined fields are stored internally as custom fields. Alternatively, some embodiments implement the predefined fields as objects with each predefined field corresponding to a different object type; when the determination of operation 638 is positive, an additional instance of the corresponding object is created and populated with the user-supplied value.

When the user-specified field name does not match the field name of any of the plurality of the predefined fields, the process 600 stores (642) the user specified field name and the user-supplied value in an allocated custom field.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A method of utilizing data records with both predefined fields and custom fields, performed at a client computer with one or more processors and memory, the method comprising:
    accessing a data record comprising a fixed set of predefined fields and a set of custom fields, wherein each predefined field comprises a predefined field name and a field value, and each custom field comprises a user-specified field name and a field value;
    displaying the data record in a graphical user interface, the graphical user interface including data entry controls for user specification of a field name and a field value;
    receiving input from a user that includes a user-specified field name in the data entry controls;
    when the user-specified field name matches a field name of a respective predefined field of the plurality of predefined fields, storing a user-supplied value in the respective predefined field; and
    when the user-specified field name does not match the field name of any of the plurality of predefined fields, storing the user-specified field name and the user-supplied value in an allocated custom field.

2. The method of claim 1, wherein each predefined field further has an associated predefined display mode;
    wherein a plurality of the predefined fields have a display mode comprising a first display mode value, the first display mode value for predefined fields that are always displayed in the graphical user interface;
    wherein a plurality of the predefined fields have a display mode comprising a second display mode value, the second display mode value for predefined fields that are displayed in the graphical user interface only when the corresponding field value is non-empty; and
    wherein displaying the data record in the graphical user interface includes suppressing display of predefined fields that have an empty field value and have a display mode comprising the second display mode value.

3. The method of claim 2, wherein displaying the data record in the graphical user interface includes:
    displaying the predefined fields that have a display mode comprising the first display mode value; and
    displaying the predefined fields, if any, that have a non-empty field value and have a display mode comprising the second display mode value.

4. The method of claim 2, including, in response to receiving the user input, determining whether the user-specified field name matches the predefined field name of any of the plurality of predefined fields having a display mode comprising the second display mode value.

5. The method of claim 1, including, in response to receiving the user input, determining whether the user-specified field name matches the predefined field name of any predefined field not displayed in the graphical user interface.

6. The method of claim 1, including, in response to receiving the user input, determining whether the user-specified field name matches the predefined field name of any of the plurality of predefined fields, including any predefined field not displayed in the graphical user interface.

7. The method of claim 1, including, in response to receiving the user input, determining whether the user-specified field name matches the predefined field name of an instance of any of the plurality of predefined fields that has a non-empty field value, and when the determination is positive, storing the user-supplied value in an additional instance of the predefined field having the predefined field name.

8. The method of claim 1, wherein the data record corresponds to a contact in a contact list of an electronic address book.

9. A client system, comprising:
one or more processors; and
memory storing one or more programs for execution by the one or more processors, the one or more programs comprising instructions for:
accessing a data record comprising a fixed set of predefined fields and a set of custom fields, wherein each predefined field has a predefined field name and a field value, and each custom field comprises a user-specified field name and a field value;
displaying the data record in a graphical user interface, the graphical user interface including data entry controls for user specification of a field name and a field value;
receiving input from a user that includes a user-specified field name in the data entry controls;
when the user-specified field name matches a field name of a respective predefined field of the plurality of predefined fields, storing a user-supplied value in the respective predefined field; and
when the user-specified field name does not match the field name of any of the plurality of predefined fields, storing the user-specified field name and the user-supplied value in an allocated custom field.

10. The client system of claim 9, wherein each predefined field further has an associated predefined display mode;
wherein a plurality of the predefined fields have a display mode comprising a first display mode value, the first display mode value for predefined fields that are always displayed in the graphical user interface;
wherein a plurality of the predefined fields have a display mode comprising a second display mode value, the second display mode value for predefined fields that are displayed in the graphical user interface only when the corresponding field value is non-empty; and
wherein displaying the data record in the graphical user interface includes suppressing display of predefined fields that have an empty field value and have a display mode comprising the second display mode value.

11. The client system of claim 10, wherein the instructions for displaying the data record in the graphical user interface include instructions for:
displaying the predefined fields that have a display mode comprising the first display mode value; and
displaying the predefined fields, if any, that have a non-empty field value and have a display mode comprising the second display mode value.

12. The client system of claim 9, including instructions, responsive to receiving the user input, for determining whether the user-specified field name matches the predefined field name of an instance of any of the plurality of predefined fields that has a non-empty field value, and when the determination is positive, for storing the user-supplied value in an additional instance of the predefined field having the predefined field name.

13. A non-transitory computer readable storage medium storing one or more programs configured for execution by a client computer system having one or more processors and memory storing one or more programs for execution by the one or more processors, the one or more programs comprising instructions to:
access a data record comprising a fixed set of predefined fields and a set of custom fields, wherein each predefined field has a predefined field name and a field value, and each custom field comprises a user-specified field name and a field value;
display the data record in a graphical user interface, the graphical user interface including data entry controls for user specification of a field name and a field value;
receive input from a user that includes a user-specified field name in the data entry controls;
when the user-specified field name matches a field name of a respective predefined field of the plurality of predefined fields, store a user-supplied value in the respective predefined field; and
when the user-specified field name does not match the field name of any of the plurality of predefined fields, store the user-specified field name and the user-supplied value in an allocated custom field.

14. The computer readable storage medium of claim 13, wherein each predefined field further has an associated predefined display mode;
wherein a plurality of the predefined fields have a display mode comprising a first display mode value, the first display mode value for predefined fields that are always displayed in the graphical user interface;
wherein a plurality of the predefined fields have a display mode comprising a second display mode value, the second display mode value for predefined fields that are displayed in the graphical user interface only when the corresponding field value is non-empty; and
wherein displaying the data record in the graphical user interface includes suppressing display of predefined fields that have an empty field value and have a display mode comprising the second display mode value.

15. The computer readable storage medium of claim 14, wherein the instructions for displaying the data record in the graphical user interface include instructions for:
displaying the predefined fields that have a display mode comprising the first display mode value; and
displaying the predefined fields, if any, that have a non-empty field value and have a display mode comprising the second display mode value.

16. The computer readable storage medium of claim 13, including instructions, responsive to receiving the user input, for determining whether the user-specified field name matches the predefined field name of an instance of any of the plurality of predefined fields that has a non-empty field value, and when the determination is positive, for storing the user-supplied value in an additional instance of the predefined field having the predefined field name.

\* \* \* \* \*